United States Patent
Seki

(10) Patent No.: US 8,572,152 B2
(45) Date of Patent: Oct. 29, 2013

(54) CORDIC COMPUTATION CIRCUIT AND METHOD

(75) Inventor: Katsutoshi Seki, Tokyo (JP)

(73) Assignee: NEC Corporation, Tokyo (JP)

( * ) Notice: Subject to any disclaimer, the term of this patent is extended or adjusted under 35 U.S.C. 154(b) by 545 days.

(21) Appl. No.: 12/919,632

(22) PCT Filed: Mar. 5, 2009

(86) PCT No.: PCT/JP2009/054188
§ 371 (c)(1),
(2), (4) Date: Aug. 26, 2010

(87) PCT Pub. No.: WO2009/110560
PCT Pub. Date: Sep. 11, 2009

(65) Prior Publication Data
US 2011/0010408 A1    Jan. 13, 2011

(30) Foreign Application Priority Data

Mar. 6, 2008 (JP) ................................. 2008-056534

(51) Int. Cl.
*G06F 7/38* (2006.01)

(52) U.S. Cl.
USPC ........................................................ 708/441

(58) Field of Classification Search
USPC ........................................................ 708/441
See application file for complete search history.

(56) References Cited

U.S. PATENT DOCUMENTS 6,772,181 B1 *  8/2004  Fu et al. ........................ 708/290

FOREIGN PATENT DOCUMENTS

| EP | 0632369 A | 1/1995 |
|---|---|---|
| JP | 9-223124 A | 8/1997 |
| JP | 2000131419 A | 5/2000 |
| JP | 2001044868 A | 2/2001 |

OTHER PUBLICATIONS

Supplementary European Search Report for EP 09 71 7736 completed Apr. 4, 2011.
D. Fu et al., "A High-Speed Processor for Digital Sine/Cosine Generation and Angle Rotation", IEEE, XP010324221, 1998, pp. 177-181.
D. E. Metafas et al., "Implementation of Given's Rotation Processors for DSP Real-Time Applications", Microprocessing and Microprogramming, vol. 38, XP000383793, 1993, pp. 351-357.
H. Lin et al., "On-line CORDIC algorithms", Computer Arithmetic, IEEE, XP010033222, 1989, pp. 26-33.
B. Parhami, "Computer Arithmetic, Algorithm and Hardware Designs", Oxford University Press, 2000, pp. 367-372.
International Search Report for PCT/JP2009/054188 mailed Jun. 30, 2009.
E. Antelo et al., "Low Latency Pipelined Circular CORDIC", Computer Arithmetic 2005. ARITH-17 2005, Proceedings of 17th IEEE Symposium on Computer Arithmetic, Jun. 2005, pp. 280-287.
Yu Hen Hu, "The Quantization Effects of the CORDIC Algorithm", IEEE Transactions on Signal Processing 40:44, D10.10, 1988, pp. 1822-1825.

(Continued)

*Primary Examiner* — Tan V. Mai

(57) ABSTRACT

Disclosed is a CORDIC circuit in which scale correction process is divided into two stages: rough correction and fine correction, and a second-process of a pseudo-rotation process is performed in parallel with the fine scale correction. A range of the fine scale correction is set so that it is not necessary to perform a scale correction with regard to a remaining rotation angle of the first half of the pseudo-rotation process.

16 Claims, 4 Drawing Sheets

(56) References Cited

OTHER PUBLICATIONS

E. F. Deprettere et al., "Pipelined CORDIC Architectures for Fast VLSI Filtering and Array Processing", in Proceedings IEEE ICASSP, Mar. 1984, pp. 41A.6.1-41A.6.4.

* cited by examiner

CORDIC COMPUTATION CIRCUIT AND METHOD

DESCRIPTION OF RELATED APPLICATION

The present invention is the National Phase of PCT/JP2009/054188, filed Mar. 5, 2009, which is based upon and claims the benefit of the priority of Japanese Patent Application No. 2008-056534 (filed on Mar. 6, 2008), the entire disclosure of which is incorporated herein in its entirety by reference thereto.

TECHNICAL FIELD

The present invention relates to a Coordinate Rotation Digital Computer (referred to as CORDIC) operational circuit, and in particular, to a linear approximation CORDIC operational circuit and method.

BACKGROUND

As a hardware-directed algorithm for an elementary function operation, such as a trigonometric function, a CORDIC (COordinate Rotation Digital Computer) algorithm is known. The CORDIC algorithm is an iterative solving method that takes a function as vector rotation on a two-dimensional plane, and finds a true value by iteratively computing vector rotation of a predetermined basic rotational angle.

In the CORDIC algorithm, by selecting a rotational coordinate system (linear, circular, or hyperbolic), and by repeating a simple operation of a shift, addition, subtraction and table look-up, multiplication and division, trigonometric function computations, exponential and logarithmic computations, and hyperbolic function computations and the like can be executed, and the algorithm is widely used in digital signal processing fields.

Taking circular polar coordinates as an example, a j-th rotation process is represented by Expression (1).

$$x(j+1) = x(j) + \sigma_j 2^{-j} y(j)$$

$$y(j+1) = y(j) - \sigma_j 2^{-j} x(j)$$

$$z(j+1) = z(j) + \sigma_j \alpha_j$$

$$\alpha_j = \arctan(2^{-j})$$

$$j = 0, 1, \ldots, n-1 \qquad (1)$$

Here, n is the number of iterations.
Furthermore, $$\sigma_j \in \{1, -1\}$$

is a rotation direction parameter.

A vector $[x(n), y(n)]'$ implementing a rotation of a rotational angle $\theta$ with respect to a vector $[x(0), y(0)]'$ is represented by Expressions (2) and (3).

$$\begin{bmatrix} x(n) \\ y(n) \end{bmatrix} = \frac{1}{K_n} \begin{bmatrix} \cos\theta & \sin\theta \\ -\sin\theta & \cos\theta \end{bmatrix} \begin{bmatrix} x(0) \\ y(0) \end{bmatrix} \qquad (2)$$

$$K_n = 1 \bigg/ \prod_{j=0}^{n-1} \sqrt{1 + 2^{-2j}} \qquad (3)$$

Here, $K_n$ is a scaling coefficient.

Rotation according to the CORDIC algorithm is pseudo-rotation that accompanies scaling. In order to correct the scaling, it is necessary to perform processing indicated in Expression (4).

$$\begin{bmatrix} xf \\ yf \end{bmatrix} = K_n \begin{bmatrix} x(n) \\ y(n) \end{bmatrix} \qquad (4)$$

As indicated in Expression (5), the CORDIC algorithm realizes a rotation operation of the rotational angle $\theta$ as a combination of basic rotation of angle $\alpha_j$.

$$\theta = \sum_{j=0}^{n-1} \sigma_j \alpha_j \qquad (5)$$

The CORDIC algorithm has 2 modes: a Rotation mode and a Vector mode, according to a method of determining the rotation direction parameter $\sigma_j$ given in Expression (6).

$$\sigma_j = \begin{cases} \text{sign}(z(j)) & \text{(Rotation)} \\ \text{sign}(y(j)) & \text{(Vectoring)} \end{cases} \qquad (6)$$

In the Rotation mode, with a desired angle $\theta$ as $z(0)$, processing is performed to rotate, by an amount $\theta$, an initial vector $[x(0), y(0)]'$.

In the Vector mode, with an initial angle $z(0)$ as 0, a process is performed to rotate the vector up to an x axis, and to obtain a rotational angle $(z(n))$ thereof and the norm $(x(n))$ of the initial vector.

Since the CORDIC algorithm implements the rotation process by n basic rotations, essentially a rotational angle error less than a final basic rotational angle $\alpha_{n-1}$ occurs.

In order that Expression (7) holds with n bit accuracy (refer to Non-Patent Document 1), the CORDIC algorithm must perform iterative processing of the same number of steps as the required bit accuracy.

$$\alpha_j = \arctan(2^{-j}) = 2^{-j} (j > n/3) \qquad (7)$$

When the CORDIC algorithm is implemented, in addition to the rotational angle error, it is necessary to take into account a rounding error that accompanies the shift addition and subtraction.

It is known that if bit width b of a data path satisfies Expression (8), an output value of n bit accuracy is obtained. Details thereof may be referred to in the descriptions of Non-Patent Documents 1 and 2.

$$b = g + n + m$$

$$g = 2$$

$$m = \log 2(n) \qquad (8)$$

where, g is the number of MSB (Most Significant Bit) guard bits for an overflow strategy, and in is the number of LSB (Least Significant Bit) guard bits in a rounding error strategy.

Since the CORDIC algorithm requires an iterative structure with the same number of stages as the required bit accuracy, it is difficult to realize speeding up using a parallel structure as seen in a multiplier.

In order to solve this problem, a linear approximation CORDIC algorithm is proposed. The linear approximation CORDIC algorithm (Rotation mode), similar to the original algorithm, performs iterative processing as indicated by Expression (1) from j=0 to n/2.

Next, instead of iterative processing from j=n/2+1 to n−1, processing as indicated in Expression (9) is performed. Here, q=j/2. The process of the Expression (9) utilizes the fact that $$\arctan(z(q))$$

can be linearly approximated by $$z(q)$$

and this is the origin of the name of "linear approximation CORDIC".

$$\begin{bmatrix} x(n) \\ y(n) \end{bmatrix} = \begin{bmatrix} x(q) + z(q)y(q) \\ y(q) - z(q)x(q) \end{bmatrix} \quad (9)$$

Finally, scale correction as indicated by Expression (10) is performed.

$$\begin{bmatrix} xf \\ yf \end{bmatrix} = K_q \begin{bmatrix} x(n) \\ y(n) \end{bmatrix} \quad (10)$$

$$K_q = 1 \Big/ \prod_{j=0}^{q} \sqrt{1 + 2^{-2j}}$$

The linear approximation CORDIC shortens processing delay by performing multiplication in which speeding up is possible using a parallel structure, instead of shift addition/subtraction iterative processing in a later stage of the original CORDIC algorithm.

FIG. 3 is a diagram showing a typical structure of a linear approximation CORDIC circuit (Rotation mode) in first related technology. The first related technology as in FIG. 3, is referred to in the description of Non-Patent Document 1. It is to be noted that in the present document, the description below concerns Rotation mode, as long as it is not particularly stated otherwise.

The linear approximation CORDIC circuit 1001 includes:
first to q-th rotation processing circuits $100_1$-$100_q$,
X and Y path constant multipliers 200x and 200y,
X and Y path variable multipliers 300x and 300y, and
X and Y path adder/subtractors 400x and 400y.

The first to q-th rotation processing circuits $100_1$-$100_q$ perform iterative processing from j=0 to q (=n/2), as indicated by Expression (1), with respect to initial values x(0), y(0), and z(0) to output x(q), y(q), and z(q).

Here, n is required bit accuracy.

Signals x(j), y(j), and z(j) are all of b bit width.

Here, b is expressed by Expression (8).

The X and Y path variable multipliers 300x and 300y, and the X and Y path adder/subtractors 400x and 400y perform processing as indicated by Expression (9), to output x(n) and y(n) of b bit width.

The X and Y path variable multipliers 300x and 300y utilizes the fact that $$z[q] < 2^{-q}$$

to extract only effective upper (n/2+m) bits of x(q), y(q), and z(q), and perform (n/2+m)×(n/2+m) bit variable multiplication.

The X and Y path constant multipliers 200x and 200y perform multiplication by a constant $K_q$ on x(n) and y(n), perform scaling processing as indicated by Expression (10), and output scaling results xf and yf of b bit width to the outside.

Since $K_q$ must be less than 1, the MSB guard bits g are unnecessary, and since the following expression may hold:

$$ct = b - g = n + m \text{ bits}$$

the X and Y path constant multipliers 200x and 200y perform (ct)×b bit constant multiplication.

With regard to the linear approximation CORDIC circuit 1001 of the first related technology, a method of further shortening the processing delay is proposed.

FIG. 4 is a diagram showing a configuration of a linear approximation CORDIC circuit in second related technology. Details of the second related technology are also described in Non-Patent Document 1.

The linear approximation CORDIC circuit 1002 of the second related technology is provided with:
first to q-th rotation processing circuits $100_1$-$100_q$,
X and Y path constant multipliers 200x and 200y,
X and Y path variable multipliers 300x and 300y,
X and Y path adder/subtractors 400x and 400y, and
a Z path constant multiplier 500.

In the linear approximation CORDIC circuit 1002 of the second related technology, in contrast to the linear approximation COMIC circuit 1001 of the first related technology, the Z path constant multiplier 500 is added, and the placements of the X and Y path constant multipliers 200x and 200y are moved to a stage before the X and Y path adder/subtractors 400x and 400y, respectively. Elements other than this are the same as those in FIG. 3.

The linear approximation CORDIC circuit 1002 of the second related technology, similar to the first related technology, performs iterative processing by the rotation processing circuits $100_1$ and $100_q$, and obtains x(q), y(q), and z(q).

The Z path constant multiplier 500 performs scaling processing on z(q), as indicated by Expression (11).

$$P = K_q z(q) \quad (11)$$

Next, processing as indicated in Expression (12) is performed.

$$\begin{bmatrix} xf \\ yf \end{bmatrix} = \begin{bmatrix} K_q x(q) + Py(q) \\ K_q y(q) - Px(q) \end{bmatrix} \quad (12)$$

Specifically, in the X and Y path constant multipliers 200x and 200y, and the X and Y path variable multipliers 300x and 300y, x(q) and y(q) are multiplied by $K_q$ and P, and using the X and Y path adder/subtractors 400x and 400y, multiplied results are added or subtracted, and xf and yf are obtained and outputted to the outside.

Since z(j) (j>n/3) can be obtained at high speed by Recoding processing utilizing the fact that Expression (7) holds, x(q) and y(q) form critical paths, even when the Z path constant multiplier 500 is added.

Details of the Recoding processing are described in Non-Patent Document 1 and a description is omitted.

In the linear approximation CORDIC circuit 1002 of the second related technology, processing of the X and Y path constant multipliers 200x and 200y, and the X and Y path variable multipliers 300x and 300y can be carried out in parallel, and since scaling processing in a later stage of the X and Y path adder/subtractors 400x and 400y is unnecessary, there is an advantage in that it is possible to shorten the processing delay, in comparison with the linear approximation CORDIC circuit 1001 of the first related technology. However, it is necessary to add the Z path constant multiplier 500, so that the circuit scale becomes large.

[Non-Patent Document 1]
Antelo, E. Villalba, J., "Low latency pipelined circular CORDIC" Computer Arithmetic 2005. ARITH-17 2005. Proceedings of 17th IEEE Symposium on Computer Arithmetic, pp. 280-287 June 2005.

[Non-Patent Document 2]
Y H Hu, "The quantization effects of the CORDIC algorithm" IEEE Transactions on Signal Processing 40:44, 834-844 pp. 1822-1825, 1988.

[Non-Patent Document 3]
E. F. Deprettere, P. Dewilde, and R. Udo, "Pipelined CORDIC architectures for fast VLSI filtering and array processing," in Proceedings IEEE ICASSP, pp. 41A.6.1-41A.6.4, March 1984.

SUMMARY

An analysis of related arts according to the present invention is given as follows.

In a linear approximation CORDIC circuit in first related art technology, there is a problem in that, since a pseudo-rotation process and scale correction are carried out sequentially, processing delay becomes large.

In a linear approximation CORDIC circuit in second related technology, there is a problem in that, a second half of the pseudo-rotation process and scale correction are preformed in parallel and a processing delay is shortened, so that scale correction is necessary with regard to remaining rotation angle of a first half of the pseudo-rotation process, and circuit scale becomes large.

It is an object of the invention to provide a CORDIC circuit and method that enable a reduction in circuit scale and realize shortening of the processing delay.

In order to solve one or more of the abovementioned problems, the invention is configured generally as follows, though not limited thereto.

According to the present invention, there is provided a CORDIC circuit in which a scale correction process is divided into two steps, rough correction and fine correction, and the second process of a pseudo-rotation process is performed in parallel with the fine scale correction.

According to the present invention, there is provided a method in which a scale correction process is divided into two steps, rough correction and fine correction, and the second process of the pseudo-rotation process is performed in parallel with the fine scale correction.

According to the present invention, by performing the second process of the pseudo-rotation process and the fine scale correction step in parallel, it is possible to shorten processing delay.

According to the present invention, since scale correction of a remaining rotation angle of the first process of the pseudo-rotation process is unnecessary, it is possible to reduce circuit scale.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictively.

PREFERRED MODES

Figure 1:
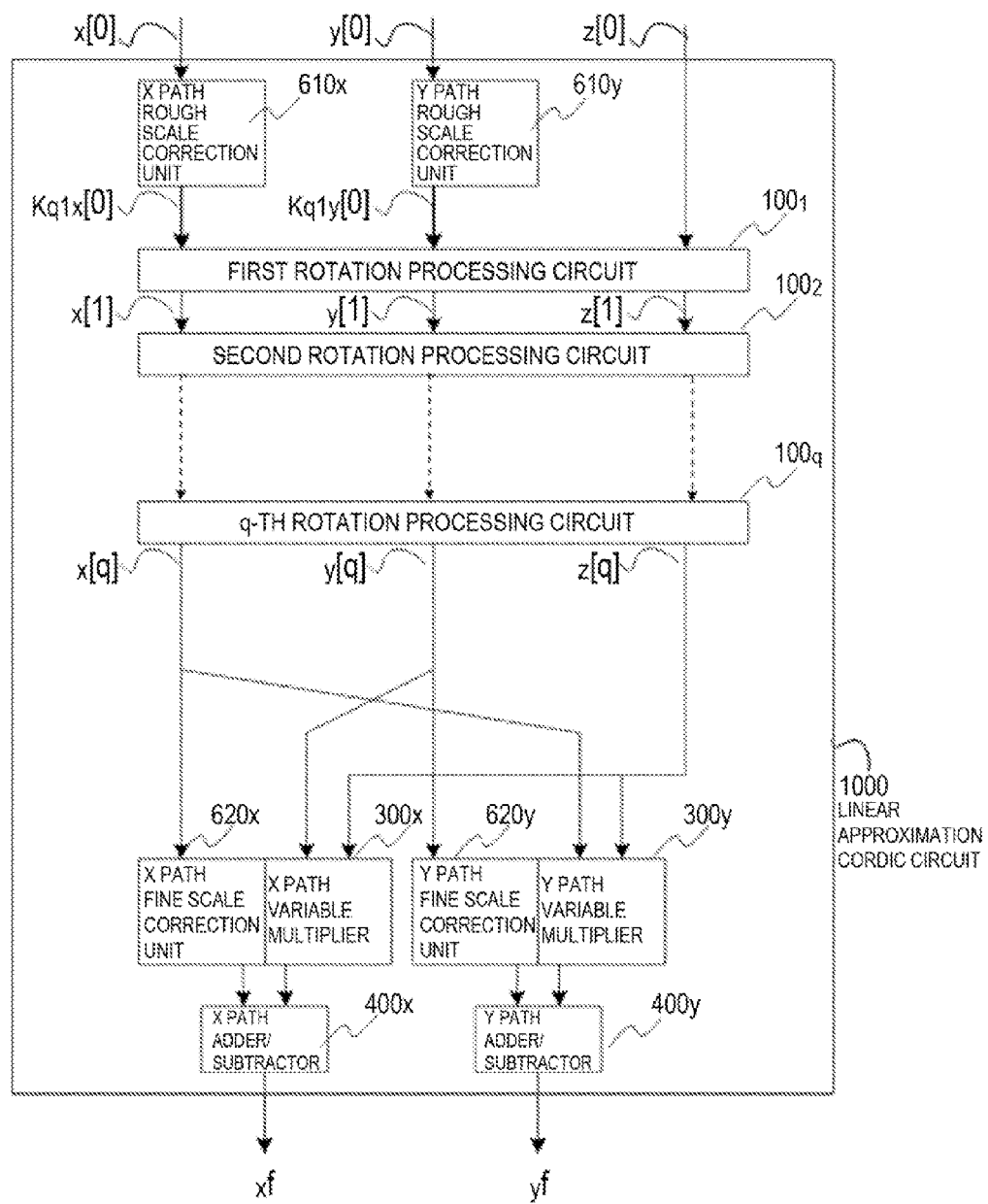
FIG. 1 is a diagram showing a configuration of a first exemplary embodiment of the present invention.

Exemplary embodiments of the present invention will be described below. In a linear approximation CORDIC circuit according to one of preferred mode of the present invention, a scale correction process is divided into two stages including a rough correction stage and a fine correction stage, and a second half of a pseudo-rotation process is performed in parallel with the fine scale correction.

In one exemplary embodiment of the present invention, the second half of the pseudo-rotation process may be realized by multiplication.

In one exemplary embodiment of the present invention, the range of the fine scale correction may be set so that it is not necessary to perform scale correction with regard to a remaining rotation angle of the first half of the pseudo-rotation process.

In one exemplary embodiment of the present invention, the scale correction process may be performed by iterative shift addition/subtraction, the fine scale correction may be performed by an iterative shift addition/subtraction process in which a shift amount is half or more of required bit accuracy, and the rough scale correction may be performed by an iterative shift addition/subtraction process in which the shift amount is less than half of the required bit accuracy.

In the present invention, the iterative shift addition/subtraction may be performed by a carry ripple adder/subtractor.

In the present invention, a CORDIC operational circuit receiving a vector (X, Y) and a rotation angle (Z) as input includes an X path rough scale correction unit ($610x$) that performs rough scale correction on an X component ($x[0]$) of the vector, and outputs a result ($K_{q1}*x[0]$) of multiplication of a rough correction scaling coefficient ($K_{q1}$) and the X component ($x[0]$), a Y path rough scale correction unit ($610y$) that performs rough scale correction on a Y component ($y[0]$) of the vector, and outputs a result ($K_{q1}*y[0]$) of multiplication of a rough correction scaling coefficient ($K_{q1}$) and the Y component ($y[0]$), and a plurality of stages (q stages) of rotation processing circuits ($100_1$ to $100_q$) connected in a cascade arrangement.

The rotation processing circuit ($100_1$) of a first stage receives the X component and the Y component outputted from the X and the Y path rough scale correction units and a rotation angle (Z) to perform iterative rotation process.

The rotation processing circuits of later stages receive the X component and the Y component, and a rotation angle outputted from the rotation processing circuit of a preceding stage to perform an iterative rotation process.

The CORDIC operational circuit further includes an X path fine scale correction unit ($620x$) that performs a fine scale correction process on the X component outputted from the rotation processing circuit ($100_q$) of a last stage, and outputs a result of multiplying a fine correction scaling coefficient and the X component, a Y path fine scale correction unit ($620y$) that performs a fine scale correction process on the Y component outputted from the rotation processing circuit ($100_q$) of the last stage, and outputs a result of multiplying a fine correction scaling coefficient and the Y component, an X path variable multiplier ($300x$) that is juxtaposed with the X path fine scale correction unit ($620x$) and multiplies the Y component y[q] outputted from the rotation processing circuit ($100_q$) of the last stage by a rotation angle (z[q]) from the rotation processing circuit ($100_q$) of the last stage, a Y path variable multiplier ($300y$) that is juxtaposed with the Y path fine scale correction unit ($620y$) and multiplies the X component x[q] outputted from the rotation processing circuit ($100_q$) of the last stage by the rotation angle z[q] from the rotation processing circuit ($100_q$) of the last stage, an X path adder/subtractor ($400x$) that outputs a result ($K_{q2}$*x[q]+z[q]*y[q]) of adding the multiplication result ($K_{q2}$*x[q]) of the X path fine scale correction unit ($620x$) and the multiplication result (z[q]*y[q]) of the X path variable multiplier ($300x$); and a Y path adder/subtractor ($400y$) that outputs a result ($k_{q2}$*y[q]−z[q]*x[q]) of subtracting from the multiplication result ($K_{q2}$*y[q]) of the Y path fine scale correction unit ($620y$), the multiplication result (z[q]*x[q]) of the Y path variable multiplier ($300y$).

In one exemplary embodiment of the present invention, in the X path rough scale correction unit ($610x$) and the Y path rough scale correction unit ($610y$), the scale correction process may be performed by an iterative shift addition/subtraction process, and the rough scale correction may be performed by an iterative shift addition/subtraction process in which the shift amount is less than half the required bit accuracy.

In one exemplary embodiment of the present invention, the X path rough scale correction unit ($610x$) and the Y path rough scale correction unit ($610y$) include in plural stages a set of a barrel shifter that shifts input from a preceding stage, and a carry ripple adder/subtractor that receives as input to be added or subtracted, output of the barrel shifter and input from the preceding stage.

In one exemplary embodiment of the present invention, in the X path fine scale correction unit ($620x$) and the Y path fine scale correction unit ($620y$), the scale correction process may be performed by iterative shift addition/subtraction, and the fine scale correction may be performed by an iterative shift addition/subtraction process in which the shift amount is half or more of the required bit accuracy.

In one exemplary embodiment of the present invention, the X path fine scale correction unit ($620x$) and the Y path fine scale correction unit ($620y$) may be configured to include a plurality of stages of sets of barrel shifters and carry ripple adder/subtractors. The barrel shifter shifts an input from a preceding stage. The carry ripple adder/subtractor receives as inputs an output of the barrel shifter and an input from the preceding stage to add or subtract the inputs.

In one exemplary embodiment of the present invention, the plural stages of rotation processing circuits connected in cascade may be configured to be provided on an input stage side, and the X and the Y path rough scale correction units ($610x$ and $610y$) may be provided in a rear stage of the plural stages of the rotation processing circuits connected in cascade.

FIG. 1 is a diagram showing a configuration of a linear approximation CORDIC circuit in one exemplary embodiment of the present invention. Referring to FIG. 1, the linear approximation CORDIC circuit 1000 of the present exemplary embodiment includes:

first to q-th rotation processing circuits $100_1$-$100_q$, the X and the Y path rough scale correction units $610x$ and $610y$, the X and the Y path fine scale correction units $620x$ and $620y$, the X and Y path variable multipliers $300x$ and $300y$, and X and Y path adder/subtractors $400x$ and $400y$.

Figure 3:
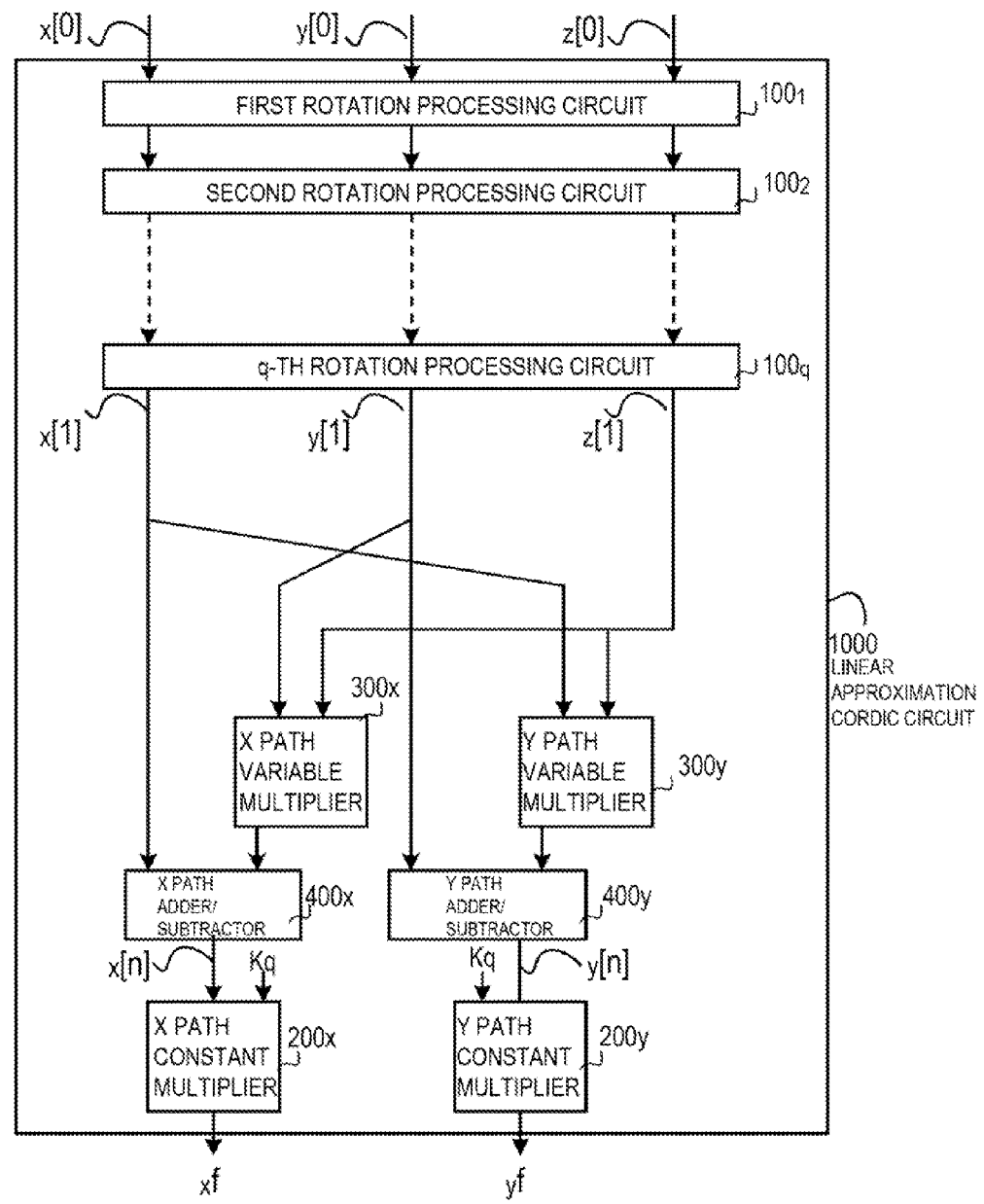
FIG. 3 is a diagram showing a configuration of a linear approximation CORDIC circuit in first related technology.

If the linear approximation CORDIC circuit 1000 of the present exemplary embodiment in FIG. 1 is compared to the linear approximation CORDIC circuit 1001 of the first related technology in FIG. 3, in the present exemplary embodiment, functions of the X and Y path constant multipliers $200x$ and $200y$ in FIG. 3 are divided into the X and the Y path rough scale correction units $610x$ and $610y$, and the X and the Y path fine scale correction units $620x$ and $620y$; the X and the Y path rough scale correction units $610x$ and $610y$ are each disposed at in input stage; and the X and the Y path fine scale correction units $620x$ and $620y$ are each disposed at a preceding stage of the X and Y path adder/subtractors $400x$ and $400y$.

Figure 4:
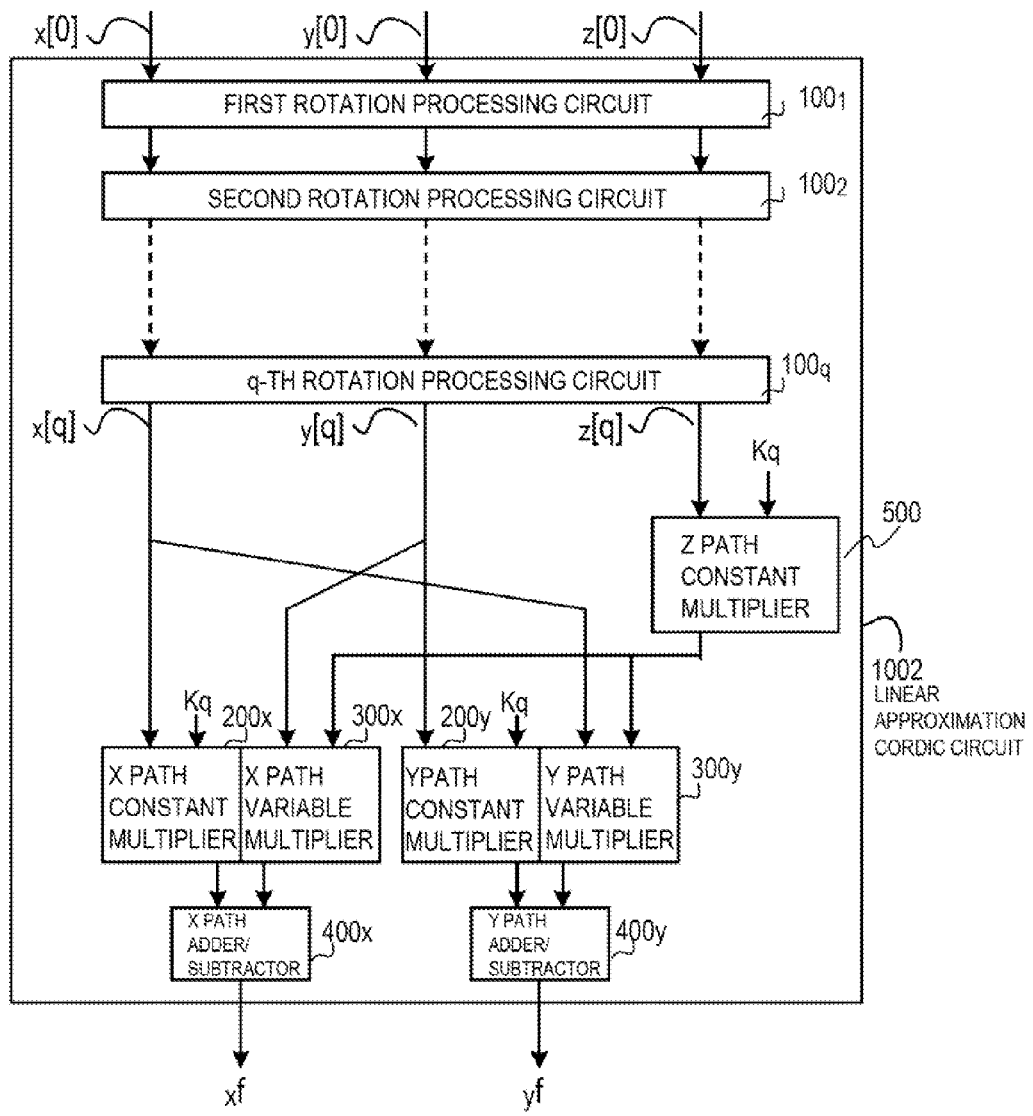
FIG. 4 is a diagram showing a configuration of a linear approximation CORDIC circuit in second related technology.

If the linear approximation CORDIC circuit 1000 of the present exemplary embodiment in FIG. 1 is compared with the linear approximation CORDIC circuit 1002 of the second related technology in FIG. 4, in the present exemplary embodiment, functions of the X and Y path constant multipliers $200x$ and $200y$ in FIG. 4 are divided into the X and the Y path rough scale correction units $610x$ and $610y$, and the X and the Y path fine scale correction units $620x$ and $620y$, and by performing the rough scale correction on an input vector [x(0), y(0)]', a Z path constant multiplier 500 is not necessary.

A description is given concerning operation and configuration of the present exemplary embodiment, with an exemplary case where the required bit accuracy is n.

A scaling coefficient $K_q$ indicated in Expression (10) can be approximated by an iterative shift addition process as indicated in Expression (13). In Expression (13), q is n/2, and $$\prod_{j=0}^{n/2}$$

represents a product from j=0 to j=n/2.

$$K_q = 1 \Big/ \prod_{j=0}^{q} \sqrt{1+2^{-2j}} = \prod_{j=0}^{n-1}(1-\gamma_j 2^{-j}) \qquad (13)$$

$$\gamma_j = \{-1, 0, 1\}$$

It is known that γ which assumes a value other than 0, can be less than or equal to log 2(n) (for details, reference should be made to the description of Non-Patent Document 3).

In the present exemplary embodiment, an iterative shift addition process where scale correction is performed is divided into two stages, the fine scale correction unit where the shift amount is greater than or equal to n/2, and the rough correction process less than n/2.

In this way, by setting the range of the fine scale correction, it is not necessary to do a scale correction with regard to the remaining rotation angle of the first half of the pseudo-rotation process, that is, with regard to output z[q] of the rotation processing circuits $100_1$ to $100_q$.

The scaling coefficient $K_q$ is given as the product of $K_{q1}$ and $K_{q2}$ as indicated in Expression (14). As indicated in Expression (15), $K_{q1}$ is derived (approximated) by an iterative shift addition process of the rough correction process of less than n/2. As indicated in Expression (16), $K_{q2}$ is derived (approximated) by an iterative shift addition process of the fine scale correction process in which the shift amount is greater than or equal to n/2.

$$K_q = K_{q1} K_{q2} \quad (14)$$

$$1st\,stage: K_{q1} = \prod_{j=0}^{n/2} (1 + \gamma_j 2^{-j}) \quad (15)$$

$$2nd\,stage: K_{q2} = \prod_{j=n/2+1}^{n-1} (1 + \gamma_j 2^{-j}) \quad (16)$$

The linear approximation CORDIC circuit 1000 of the present exemplary embodiment has, as input, an input vector [x(0), y(0)]' and a desired rotation angle z(0), and the input vector [x(0), y(0)]' is supplied to the X and the Y path rough scale correction units 610x and 610y.

The X and the Y path rough scale correction units 610x and 610y perform rough scale correction processing on the input vector [x(0), y(0)]' and supply $K_{q1}x(0)$ and $K_{q1}y(0)$ to a first rotation processing circuit 100$_1$ ($K_{q1}$ is given as in Expression (15)).

The first rotation processing circuit 100$_1$ has as input $K_{q1}x(0)$, $K_{q1}y(0)$, and z(0), performs processing as indicated in Expression (17), and supplies x(1), y(q), and z(1) to a second rotation processing circuit 100$_2$. It is to be noted that "sign" in Expression (17) is a sign operator.

$x(1) = K_{q1}x(0) + \sigma_0 K_{q1}y(0)$ $y(1) = K_{q1}y(0) - \sigma_0 K_{q1}x(0)$ $z(1) = z(0) + \sigma_0 \pi/4$ $\sigma_0 = \text{sign}(z(0))$ \quad (17)

The second to q-th rotation processing circuits 100$_2$ to 100$_q$ perform iterative processing as indicated by Expression (18) on x(1), y(1), and z(1), and output x(q), y(q), and z(q). Signals x(j), y(j), and z(j) (j=0 to q) are all of b bit width. Here, b is given by Expression (8).

$x(j+1) = x(j) + \sigma_j 2^{-j} y(j)$ $y(j+1) = y(j) - \sigma_j 2^{-j} x(j)$ $z(j+1) = z(j) + \sigma_j \alpha_j$ $\alpha_j = \arctan(2^{-j})$ $\sigma_j = \text{sign}(z(j))$ $j = 1, \ldots, q-1$ \quad (18)

In case of performing processing equivalent to the linear approximation CORDIC circuit 1002 of the second related technology, the processing indicated in Expressions (19) and (20) may be performed regarding x(q), y(q), and z(q).

$$P = K_{q2} z(q) \quad (19)$$

$$\begin{bmatrix} xf \\ yf \end{bmatrix} = \begin{bmatrix} K_{q2} x(q) + Py(q) \\ K_{q2} y(q) - Px(q) \end{bmatrix} \quad (20)$$

Here, in an original (not linear approximation) CORDIC, a rotation angle error less than a final basic rotation angle $\alpha_{n-1} (\approx 2^{-(n-1)})$ essentially occurs, but in consideration of the fact that n bit accuracy can be realized, it is understood that there is no problem if an error less than $K_{q2} \alpha_{n-1}$ occurs in P indicated in Expression (19).

In consideration of the fact that z(q) is less than $2^{-n}/2$, an angle error E in case of z(q) not subjected to scaling processing, is less than $2^{-n}$ and is smaller than an approximate value $2^{-n+1}$ of $K_{q2} \alpha_{n-1}$.

Thus, in the linear approximation CORDIC circuit 100 of the present exemplary embodiment, it is possible to skip the scaling processing with regard to z(q).

$$\begin{aligned} E &= P - z(q) \quad (21) \\ &= K_{q2} z(q)(1 - 1/K_{q2}) \\ &= K_{q2} z(q) \left( 1 - 1 \Big/ \prod_{j=n/2+1}^{n-1} (1 + \gamma_j 2^{-j}) \right) \\ &\cong K_{q2} z(q) \sum_{j=n/2+1}^{n-1} \gamma_j 2^{-j} \\ &\cong z(q) \sum_{j=n/2+1}^{n-1} \gamma_j 2^{-j} < z(q) 2^{-n/2} < 2^{-n} \end{aligned}$$

$$K_{q2} \alpha_{n-1} \cong 2^{-n+1} \quad (22)$$

More specifically, x(q) and y(q) are multiplied by $K_{q2}$ and z(q), in the X and Y path constant multipliers 200x and 200y (X and the Y path fine scale correction units 620x and 620y) and the X and Y path variable multipliers 300x and 300y, and using the X and Y path adder/subtractors 400x and 400y, the multiplication result is added or subtracted in accordance with Expression (23) to find xf and yf which are outputted to the outside.

$$\begin{bmatrix} xf \\ yf \end{bmatrix} = \begin{bmatrix} K_{q2} x(q) + z(q) y(q) \\ K_{q2} y(q) - z(q) x(q) \end{bmatrix} \quad (23)$$

Figure 2:
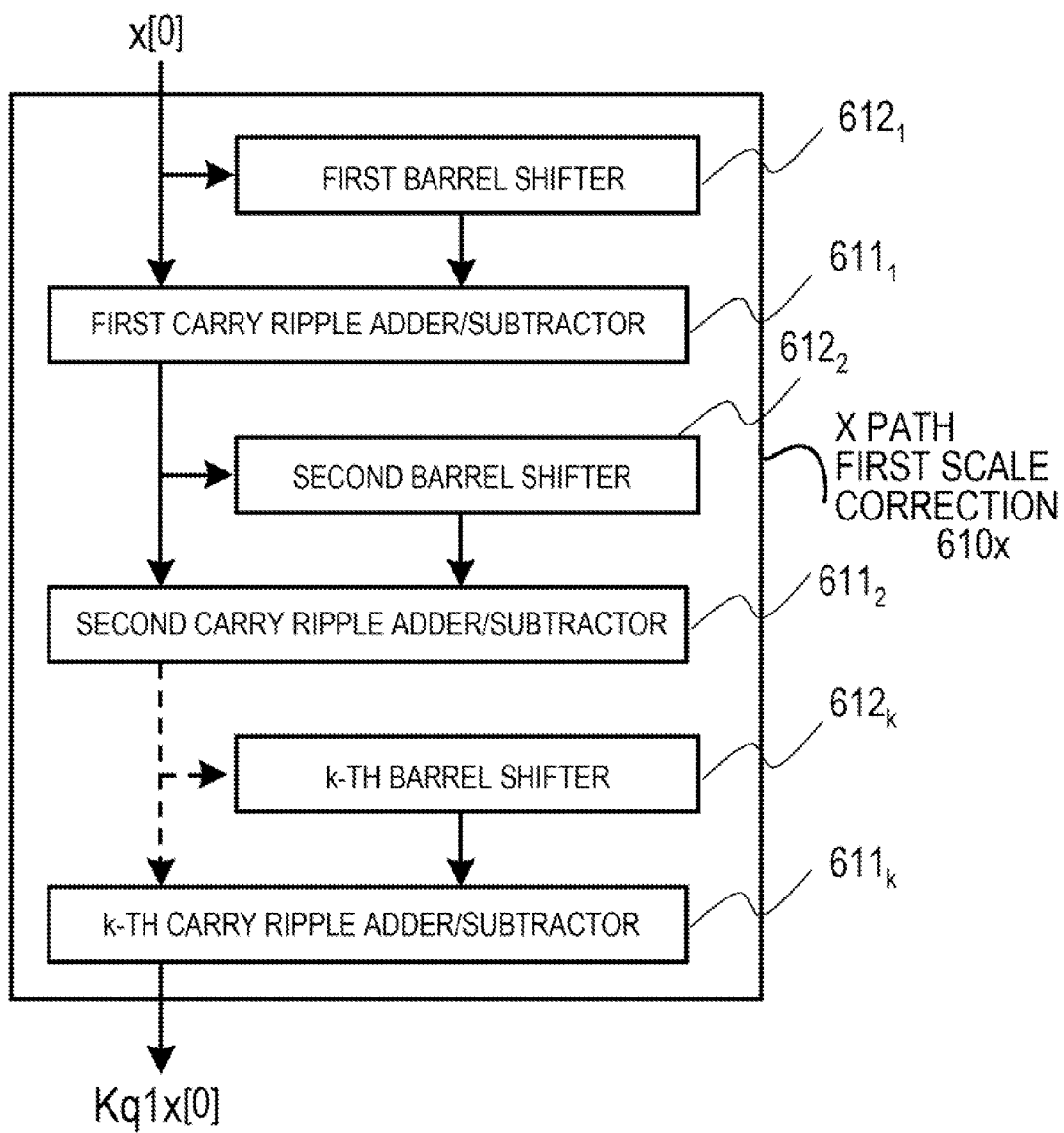
FIG. 2 is a diagram showing a configuration of an X path rough scale correction unit included in the first exemplary embodiment of the present invention.

FIG. 2 shows a configuration example of the X path rough scale correction unit 610x of the present exemplary embodiment. It is assumed that in the iterative shift addition/subtraction process indicated in Expression (13), γ has a value other than 0, the number of shift addition/subtraction processes in which the shift amount is less than or equal to n/2 is k, and respective shift amounts are $s_0, \ldots s_{k-1}$.

In this case, the X path rough scale correction unit 610x of the present exemplary embodiment is configured from first to k-th carry ripple adder/subtractors 611$_1$ to 611$_k$, and first to k-th barrel shifters 612$_1$ to 612$_k$. The first to k-th barrel shifters 612$_1$ to 612$_k$ shift an input signal from a preceding stage, in accordance with the shift amounts of $s_0, \ldots s_{k-1}$, respectively.

The first to k-th carry ripple adder/subtractors 611$_1$ to 611$_k$ add or subtract a shifted signal and an original signal in accordance with $\gamma_{s0}$ to $\gamma_{sk-1}$.

In case of n=16, $K_q$ is expressed by $\{1+2^{\wedge}(-2)\}*\{1-2^{\wedge}(-5)\}*\{1+2^{\wedge}(-9)\}*\{1+2^{\wedge}(-10)\}$ (note that ^ indicates an exponent), and k=2, $s_0=2$, $s_1=5$.

The Y path rough scale correction unit 610y and the X and Y path fine scale correction units 620x and 620y can be realized by a similar type of configuration.

The carry ripple adder/subtractor confirms an addition/subtraction result from an LSB side and hence there is a problem that in iterative shift addition/subtraction processing, with a larger shift amount, calculation cannot be started until a preceding stage MSB side is confirmed.

A delay occurring due to this problem is referred to as "shift ripple delay". A shift ripple delay due to 1 bit shift is normalized as 1 shift ripple delay. If wiring delay is ignored, an LSB bit output delay of the scale correction unit matches a shift ripple delay of the total shift amount within the scale correction unit. Therefore, in a case the number of iteration stages is the same, in the rough scale correction units 610x and 610y and the fine scale correction units 620x and 620y, the delay of the fine scale correction units 620x and 620y is invariably large.

In case of n=16, the delay ratio is (9+10)/(2+5)=2.7 times. In the entire shift ripple delays, the ratio occupied by the rough scale correction unit is (2+5)/(2+5+9+10)=27%.

It is to be noted that in the configuration of the present embodiment fa description has been given with the carry ripple adder/subtractors as an example, but the present invention clearly does not depend on adder/subtractor method.

In the present exemplary embodiment, since the ratio occupied by the rough scale correction unit is very low with respect to the scale correction process overall delay, compared with the linear approximation CORDIC circuit 1002 of the second related technology, almost no process delay increase occurs. At the same time, since a scaling process with regard to the Z path is unnecessary, the circuit scale can be reduced.

In the present exemplary embodiment, since the fine scale correction unit, which covers a large portion of the delay due to the overall scale correction processing, carries out processing in parallel with the X and Y path constant multipliers 200x and 200y, compared to the linear approximation CORDIC circuit 1001 of the first related technology, it is possible to reduce the processing delay to a large extent.

It is to be noted that in the present exemplary embodiment a description has been given of an example of a case where the scale correction is realized by iterative shift addition, and a division is made into 2 stages, the fine scale correction unit having a shift amount of n/2 or more, and the rough correction process of less than n/2, but if the range of the fine scale correction is set so that it is not necessary to do a scale correction with regard to a remaining rotation angle of the first half of the pseudo-rotation process, the present invention is clearly effective without depending on a method of implementing the scale correction.

Furthermore, a description has been given of the present exemplary embodiment with an exemplary case where the rough scale correction is performed at the input stage, but the present invention is not limited to the configuration in question, and is clearly effective without depending on a position of the rough scale correction. For example, the X and the Y path rough scale correction units 610x and 610y may be disposed in a later stage of the first to q-th rotation process units $100_1$ to $100_q$.

Each disclosure of the abovementioned Non-Patent Documents 1, 2, and 3 is incorporated by reference into the present document. Modifications and adjustments of embodiments and examples are possible within bounds of the entire disclosure (including the range of the claims) of the present invention, and also based on fundamental technological concepts thereof Furthermore, a wide variety of combinations and selections of various disclosed elements is possible within the scope of the claims of the present invention. That is, the present invention clearly includes every type of transformation and modification that a person skilled in the art can realize according to technological concepts and the entire disclosure including the scope of the claims.

What is claimed is:

1. A CORDIC computation circuit receiving an input vector and a rotation angle, comprising:
    a rough scale correction stage that receives X and Y components of the input vector and that performs rough scale correction on the X and Y components of the input vector to output results of multiplication of a rough correction scaling coefficient and the X and Y components, respectively;
    a rotation processing unit that receives the results output from the rough scale correction stage and the rotation angle and that performs a first half of pseudo-rotation process on the results from the rough scale correction stage using the rotation angle to output resulting X and Y components;
    a fine scale correction stage that receives the X and Y components form the first half of the pseudo-rotation process of the rotation processing unit and that performs a fine scale correction on the X and Y components from the first half of the pseudo-rotation process to output results of multiplication of a fine correction scaling coefficient and the X and Y components, respectively, a scale correction process being divided into two stages including the rough scale correction stage and the fine scale correction stage; and
    a unit that receives the X and Y components from the first half of the pseudo-rotation process of the rotation processing unit and a rotation angle from the first half of the pseudo-rotation process of the rotation processing unit and that performs a second half of the pseudo-rotation process multiplying the X and Y components from the first half of the pseudo-rotation process by the rotation angle from the first half of the pseudo-rotation process, the second half of the pseudo-rotation process being performed in parallel with the fine scale correction stage.

2. The CORDIC computation circuit according to claim 1, wherein the fine scale correction has a range set so as to make it unnecessary to perform a scale correction with regard to a remaining rotation angle of the first half of the pseudo-rotation process.

3. The CORDIC computation circuit according to claim 1, wherein the fine scale correction stage performs the fine scale correction by an iterative shift addition/subtraction in which a shift amount is half or more of a required bit accuracy, and
    the rough scale correction stage performs the rough scale correction by an iterative shift addition/subtraction in which the shift amount is less than half of a required bit accuracy.

4. The CORDIC computation circuit according to claim 3, wherein the rough scale correction stage and the fine scale correction stage each comprises a carry ripple adder/subtractor that performs the iterative shift addition/subtraction.

5. A CORDIC computation circuit receiving a vector (X,Y) and a rotation angle (Z) as inputs, comprising:
    an X path rough scale correction unit that performs rough scale correction on an X component of the vector (X,Y), and outputs a result of multiplication of a rough correction scaling coefficient and the X component;
    a Y path rough scale correction unit that performs rough scale correction on a Y component of the vector, and outputs a result of multiplication of a rough correction scaling coefficient and the Y component;

a plurality of stages of rotation processing circuits connected in cascade, the rotation processing circuit of a first stage receiving an X component and a Y component outputted respectively from the X and Y path rough scale correction units, and a rotation angle to perform an iterative rotation process, a rotation processing circuit of a later stage receiving an X component, a Y component and a rotation angle outputted from a rotation processing circuit of a preceding stage to perform an iterative rotation process;

an X path fine scale correction unit that performs a fine scale correction on an X component outputted from the rotation processing circuit of a last stage, and outputs a result of multiplying a fine correction scaling coefficient and the X component;

a Y path fine scale correction unit that performs a fine scale correction on a Y component outputted from the rotation processing circuit of a last stage, and outputs a result of multiplication of a fine correction scaling coefficient and the Y component;

an X path variable multiplier juxtaposed with the X path fine scale correction unit to multiply a Y component outputted from the rotation processing circuit of a last stage by a rotation angle from the rotation processing circuit of a last stage;

a Y path variable multiplier juxtaposed with the Y path fine scale correction unit to multiply an X component outputted from the rotation processing circuit of a last stage by a rotation angle from the rotation processing circuit of a last stage;

an X path adder/subtractor that outputs a result of adding or subtracting a multiplication result of the X path fine scale correction unit and a multiplication result of the X path variable multiplier; and a Y path adder/subtractor that outputs a result of adding or subtracting a multiplication result of the Y path fine scale correction unit and a multiplication result of the Y path variable multiplier.

6. The CORDIC computation circuit according to claim 5, wherein, in the X path rough scale correction unit and the Y path rough scale correction unit, the scale correction process is performed by iterative shift addition/subtraction, and rough scale correction is performed by an iterative shift addition/subtraction process in which the shift amount is less than half a required bit accuracy.

7. The CORDIC computation circuit according to claim 6, wherein the X and Y path rough scale correction units include plural stages of sets, each set including a barrel shifter that shifts an input from a preceding stage; and a carry ripple adder/subtractor that receives an input from a preceding stage and an output of the barrel shifter to perform addition or subtraction of the received signals.

8. The CORDIC computation circuit according to claim 5, wherein, in the X and Y path fine scale correction units, the scale correction process is performed by iterative shift addition/subtraction, and the fine scale correction is performed by an iterative shift addition/subtraction process in which a shift amount is half or more of a required bit accuracy.

9. The CORDIC computation circuit according to claim 8, wherein the X and Y path fine scale correction units include plural stages of sets, each set including:

a barrel shifter that shifts an input from a preceding stage; and a carry ripple adder/subtractor that receives an input from a preceding stage and an output of the barrel shifter to perform addition or subtraction of the received signals.

10. The CORDIC computation circuit according to claim 5, wherein the plurality of stages of the rotation processing circuits connected in cascade are provided on an input stage side, and the X and Y path rough scale correction units are provided at a rear stage of the plurality of stages of the rotation processing circuits connected in cascade.

11. A method for performing a CORDIC operation using a CORDIC computation circuit, the method comprising:

receiving, by the CORDIC computation circuit, an input vector and a rotation angle;

performing, by the CORDIC computation circuit, a rough scale correction on X and Y components of the input vector to output results of multiplication of a rough correction scaling coefficient and the X and Y components, respectively;

performing, by the CORDIC computation circuit, a first half of a pseudo-rotation process on the results output from the rough scale correction using the rotation angle to output resulting X and Y components;

performing, by the CORDIC computation circuit, a fine scale correction on the X and Y components resulting from the first half of a pseudo-rotation process to output results of multiplication of a fine correction scaling coefficient and the X and Y components, respectively; and performing, by the CORDIC computation circuit, a second half of a pseudo-rotation process in parallel with the fine scale correction process, the second half of the pseudo-rotation process multiplying the X and Y components resulting from the first half of the pseudo-rotation process by a rotation angle from the first half of the pseudo-rotation process.

12. The method according to claim 11, wherein the range of the fine scale correction is set so as to make it unnecessary to perform a scale correction with regard to a remaining rotation angle of a first half of the pseudo-rotation process.

13. The method according to claim 11, wherein the fine scale correction is performed by an iterative shift addition/subtraction process in which a shift amount is half or more than a required bit accuracy, and the rough scale correction is performed by an iterative shift addition/subtraction process in which the shift amount is less than half of a required bit accuracy.

14. The method according to claim 13, wherein the iterative shift addition/subtraction is performed by a carry ripple adder/subtractor.

15. A CORDIC computation circuit receiving a vector (X, Y) and a rotation angle (Z), comprising:

an X path rough scale correction unit that performs a rough scale correction process on an X component x(0) of an input vector, and outputs Kq1*x(0);

a Y path rough scale correction unit that performs a rough scale correction process on a Y component y(0) of the input vector, and outputs Kq1*y(0);

first to q-th rotation processing circuits connected in cascade;

an X path fine scale correction unit that performs a fine scale correction process on an X component x(q) outputted from the q-th rotation processing circuit, and outputs a result $K_{q2}*x(q)$ of multiplying a fine correction scaling coefficient $K_{q2}$ and the X component x(q);

a Y path fine scale correction unit that performs a fine scale correction process on a Y component y(q) outputted from the q-th rotation processing circuit, and outputs a result $K_{q2}*y(q)$ of multiplying a fine correction scaling coefficient $K_{q2}$ and the Y component y(q);

an X path variable multiplier juxtasposed with the X path fine scale correction unit to output a result $z(q)*y(q)$ of multiplying a Y component y(q) outputted from the q-th rotation processing circuit and a rotation angle z(q) from the q-th rotation processing circuit;

a Y path variable multiplier juxtasposed with the Y path fine scale correction unit to output a result $z(q)*x(q)$ of multiplying an X component x(q) outputted from the q-th rotation processing circuit and a rotation angle z(q) from the q-th rotation processing circuit;

an X path adder/subtractor that outputs a result of adding a multiplication result $K_{q2}*x(q)$ of the X path fine scale correction unit and a multiplication result $z(q)*y(q)$ of the X path variable multiplier, and a Y path adder/subtractor that outputs a result of subtracting a multiplication result $K_{q2}*y(q)$ of the Y path fine scale correction unit and a multiplication result $z(q)*x(q)$ of the Y path variable multiplier, wherein a scaling coefficient $K_q$ is expressed as a product $K_{q1}*K_{q2}$ of the rough correction scaling coefficient $K_{q1}$ and the fine correction scaling coefficient $K_{q2}$, the rough correction scaling coefficient $K_{q1}$, being given as:

$$K_{q1} = \prod_{j=0}^{n/2} (1 + \gamma_j 2^{-j})$$

where $$\gamma_j = \{-1, 0, 1\}$$

in the X path rough scale correction unit and Y path rough scale correction unit, a rough scale correction being derived by an iterative shift addition process, for scale correction, of less than half of a prescribed bit accuracy n, the fine correction scaling coefficient $K_{q2}$ being given as $$K_{q2} = \prod_{j=n/2+1}^{n-1} (1 + \gamma_j 2^{-j})$$

where $$\gamma_j = \{-1, 0, 1\}$$

the first rotation processing circuit receiving $K_{q1}*x(\mathbf{0})$ and $K_{q1}*y(\mathbf{0})$ outputted from the X path rough scale correction unit and the Y path rough scale correction unit, and a rotation angle $z(\mathbf{0})$ to output vector $x(\mathbf{1})$ and $y(\mathbf{1})$ and rotation angle $z(\mathbf{1})$ by computation as follows:

$x(1) = K_{q1}x(0) + \sigma_0 K_{q1}y(0)$ $y(1) = K_{q1}y(0) - \sigma_0 K_{q1}x(0)$ $z(1) = z(0) + \sigma_0 \pi/4$ $\sigma_0 = \text{sign}(z(0))$ a (j+1)-th rotation processing circuit (where j=1 to q−1) receiving x(j), y(j), and z(j) outputted from a j-th rotation processing circuit to output vector x(j+1) and y(j+1) and rotation angle z(j+1) by computation as follows:

$x(j+1) = x(j) + \sigma_j 2^{-j} y(j)$ $y(j+1) = y(j) - \sigma_j 2^{-j} x(j)$ $z(j+1) = z(j) + \sigma_j \alpha_j$ $\alpha_j = \arctan(2^{-j})$ $\sigma_j = \text{sign}(z(j))$ $j = 1, \ldots, q-1$ computation of a product $K_{q2}*x(q)$ of the fine correction scaling coefficient $K_{q2}$ and output x(q) of the q-th rotation processing circuit, in the X path fine scale correction unit, and computation of a product $z(q)*y(q)$ of output z(q) and y(q) of the q-th rotation processing circuit, in the X path variable multiplier, being performed in parallel, computation of a product $K_{q2}*y(q)$ of the fine correction scaling coefficient $K_{q2}$ and output y(q) of the q-th rotation processing circuit, in the Y path fine scale correction unit, and computation of a product $z(q)*x(q)$ of output z(q) and x(q) of the q-th rotation processing circuit, in the Y path variable multiplier, being performed in parallel, the X path adder/subtractor outputting $K_{q2}*x(q) + z(q)*y(q)$, and the Y path adder/subtractor outputting $K_{q2}*y(q) - z(q)*x(q)$.

16. The CORDIC computation circuit according to claim 15, wherein a scaling process on an output z(q) of the q-th rotation processing circuit is skipped.

* * * * *